United States Patent
Briscoe et al.

(10) Patent No.: US 9,679,256 B2
(45) Date of Patent: Jun. 13, 2017

(54) AUTOMATED ASSESSMENT OF EXAMINATION SCRIPTS

(75) Inventors: Ted Briscoe, Cambridge (GB); Ben Medlock, London (GB); Oeistein Andersen, Cambridge (GB)

(73) Assignee: THE CHANCELLOR, MASTERS AND SCHOLARS OF THE UNIVERSITY OF CAMBRIDGE, Cambridge (GB)

(*) Notice: Subject to any disclaimer, the term of this patent is extended or adjusted under 35 U.S.C. 154(b) by 506 days.

(21) Appl. No.: 12/899,260

(22) Filed: Oct. 6, 2010

(65) Prior Publication Data

US 2012/0088219 A1 Apr. 12, 2012

(51) Int. Cl.
*G09B 7/00* (2006.01)
*G06N 99/00* (2010.01)

(52) U.S. Cl.
CPC ................... *G06N 99/005* (2013.01)

(58) Field of Classification Search
CPC ........................................... G09B 7/00
USPC ........................................ 434/362, 353, 350
See application file for complete search history.

(56) References Cited

U.S. PATENT DOCUMENTS

| | | | |
|---|---|---|---|
| 4,958,284 A * | 9/1990 | Bishop et al. | 434/353 |
| 5,321,611 A | 6/1994 | Clark et al. | |
| 5,437,554 A | 8/1995 | Clark et al. | |
| 5,458,493 A | 10/1995 | Clark et al. | |
| 5,466,159 A | 11/1995 | Clark et al. | |
| 5,558,521 A | 9/1996 | Clark et al. | |
| 5,619,709 A * | 4/1997 | Caid et al. | 715/209 |
| 5,832,470 A * | 11/1998 | Morita et al. | |
| 6,115,683 A * | 9/2000 | Burstein et al. | 704/1 |
| 6,181,909 B1 | 1/2001 | Burstein et al. | |
| 6,356,864 B1 * | 3/2002 | Foltz | G06F 17/2785 434/353 |

(Continued)

FOREIGN PATENT DOCUMENTS

EP 1239438 A2 9/2002
EP 1249782 A1 10/2002

(Continued)

OTHER PUBLICATIONS

Wu et al., "A Computer Aided Grading System for Subjective Tests," Conference on Telecommunications, 2006, AICT-ICIW '06, International Conference on Internet and Web Applications and Services/Advanced International, Feb. 19-25, 2006.

(Continued)

*Primary Examiner* — Sam Yao
*Assistant Examiner* — Alvin Carlos
(74) *Attorney, Agent, or Firm* — Nixon & Vanderhye P.C.

(57) ABSTRACT

Embodiments herein provide automated assessment of examination scripts, such as English for Speakers of Other Languages (ESOL) examination scripts, written in response to prompts eliciting free text answers. In an embodiment, the task may be defined as discriminative preference ranking. Further, a system employing such methodology may be trained and tested on a corpus of manually-graded scripts. Embodiments herein, unlike extant solutions, are relatively prompt-insensitive and resistant to subversion, even if the operating principles are known. Embodiments may also detect scripts which are linguistically good but non-responsive to prompts such as memorized responses.

40 Claims, 9 Drawing Sheets

Automated Assessment for ESOL Text System

(56) References Cited

U.S. PATENT DOCUMENTS

| | | | |
|---|---|---|---|
| 6,366,759 B1* | 4/2002 | Burstein et al. | 434/353 |
| 6,418,298 B1 | 7/2002 | Sonnenfeld | |
| 6,461,166 B1* | 10/2002 | Berman | 434/323 |
| 6,616,453 B2 | 9/2003 | Kouba et al. | |
| 6,718,336 B1 | 4/2004 | Saffer et al. | |
| 6,749,435 B2 | 6/2004 | Clark et al. | |
| 6,751,351 B2 | 6/2004 | Knowles et al. | |
| 6,810,232 B2 | 10/2004 | Knowles et al. | |
| 6,961,482 B2 | 11/2005 | Knowles | |
| 7,062,220 B2* | 6/2006 | Haynes et al. | 434/353 |
| 7,088,949 B2* | 8/2006 | Burstein et al. | 434/353 |
| 7,454,393 B2 | 11/2008 | Horvitz et al. | |
| 7,493,293 B2 | 2/2009 | Kanungo et al. | |
| 7,567,906 B1 | 7/2009 | Begeja et al. | |
| 7,644,057 B2* | 1/2010 | Nelken et al. | 706/55 |
| 7,720,675 B2* | 5/2010 | Burstein et al. | 704/9 |
| 7,752,159 B2* | 7/2010 | Nelken et al. | 706/62 |
| 7,769,339 B2* | 8/2010 | Burstein et al. | 434/353 |
| 7,796,937 B2* | 9/2010 | Burstein et al. | 434/353 |
| 7,831,196 B2* | 11/2010 | Attali et al. | 434/353 |
| 8,185,378 B2* | 5/2012 | Burstein et al. | 704/9 |
| 8,275,306 B2* | 9/2012 | Attali | G09B 7/02 434/322 |
| 8,467,716 B2* | 6/2013 | Burstein et al. | 434/353 |
| 8,472,861 B2* | 6/2013 | Andreyev et al. | 434/353 |
| 2002/0087346 A1 | 7/2002 | Harkey | |
| 2003/0031996 A1* | 2/2003 | Robinson | 434/350 |
| 2003/0149692 A1* | 8/2003 | Mitchell | 707/4 |
| 2004/0175687 A1* | 9/2004 | Burstein et al. | 434/353 |
| 2005/0142529 A1* | 6/2005 | Andreyev et al. | 434/362 |
| 2005/0223002 A1* | 10/2005 | Agarwal et al. | 707/7 |
| 2006/0014129 A1* | 1/2006 | Coleman et al. | 434/322 |
| 2006/0100852 A1 | 5/2006 | Gamon et al. | |
| 2006/0155751 A1 | 7/2006 | Geshwind et al. | |
| 2006/0172276 A1* | 8/2006 | Higgins et al. | 434/362 |
| 2009/0119235 A1 | 5/2009 | Kanungo et al. | |
| 2009/0192966 A1 | 7/2009 | Horvitz et al. | |
| 2009/0226872 A1* | 9/2009 | Gunther | 434/350 |

FOREIGN PATENT DOCUMENTS

| | | |
|---|---|---|
| EP | 1288823 A1 | 3/2003 |
| EP | 1296265 A1 | 3/2003 |
| EP | 1410235 A2 | 4/2004 |
| EP | 1462950 A1 | 9/2004 |
| EP | 1535261 A1 | 6/2005 |
| EP | 1291800 A1 | 3/2006 |
| GB | 2337844 A | 12/1999 |
| GB | 2401970 A | 11/2004 |
| WO | WO98/43223 A1 | 10/1998 |
| WO | WO01/71529 A2 | 9/2001 |
| WO | WO03/079313 A1 | 9/2003 |
| WO | WO2004/001700 A1 | 12/2003 |
| WO | WO 2011/042710 A1 | 4/2011 |

OTHER PUBLICATIONS

Wei et al., "Comparison and analysis of the development in grading subjective tests algorithms," Second International Conference on Intelligent Networks and Intelligent Systems, Nov. 1-3, 2009, pp. 494-497.

Hernan-Losada et al., "Testing-Based Automatic Grading: A Proposal from Bloom's Taxonomy," Eighth IEEE International Conference on Advanced Learning Technologies, Jul. 1-5, 2008, pp. 847-849.

Landauer et al., "Automatic Essay Assessment," Assessment in Education, vol. 10, No. 3, Nov. 2003.

Kakkonen et al., "Automatic Essay Grading with Probabilistic Latent Semantic Analysis," Proceedings of the 2nd Workshop on Building Educational Applications Using NLP, Jun. 2005, pp. 29-36.

Burstein et al., "A Machine Learning Approach for Identification of Thesis and Conclusion Statements in Student Essays," Computers and the Humanities, vol. 37, No. 4, Nov. 2003, pp. 455-467.

Baroni et al., "ISA meets Lara: An incremental word space model for cognitively plausible simulations of semantic learning," Proceedings of the Workshop on Cognitive Aspects of Computational Language Acquisition, Association for Computational Linguistics, Jun. 2007, pp. 49-56, Prague, Czech Republic.

Collins, Michael, "Discriminative Training Methods for Hidden Markov Models: Theory and Experiments with Perceptron Algorithms," Proceedings of the Conference on Empirical Methods in Natural Language Processing (EMNLP), Association for Computational Linguistics, Philadelphia, Jul. 2002, pp. 1-8.

Joachims, Thorsten, "Optimizing Search Engines using Clickthrough Data," SIGKDD, Association Computing Machinery, 2002, Edmonton, Alberta, Canada.

Kanejiya et al., "Automatic Evaluation of Students' Answers using Syntactically Enhanced LSA," HLT-NAACL 03 Workshop on Building Educational Applications Using Natural Language Processing, Assoc. for Comp. Linguistics, 2003

Larkey, Leah S., "Automatic Essay Grading Using Text Categorization Techniques," 21st ACM-SIGIR International Conference on Research and Development in Information Retrieval, Association for Computing Machinery, Melbourne, Austraila, Aug. 24-28, 1998.

Lonsdale et al., "Automated Rating of ESL Essays," HLT-NAACL 03 Workshop on Building Educational Applications Using Natural Language Processing, Assoc. for Comp. Linguistics, 2003

Rudner et al., "Automated Essay Scoring Using Bayes' Theorem," Journal of Technology, Learning and Assessment, Boston College, vol. 1, No. 2, 2002.

Bloom, Burton H., "Space/Time Trade-offs in Hash Coding with Allowable Errors," Communications of the ACM, vol. 13 / No. 7 / Jul. 1970, pp. 422-426.

Kakkonen et al., "Applying Latent Dirichlet Allocation to Automatic Essay Grading," FinTAL 2006, Springer-Verlag Berlin Heidelberg 2006, LNAI 4139, 2006, Joensuu, Finland, pp. 110-120.

Page, Ellis Batten, "Computer Grading of Student Prose, Using Modern Concepts and Software," The Journal of Experimental Education, vol. 62, No. 2 (Winter, 1994), pp. 127-142.

Briscoe, T. et al. "Text Processing Tools and Services from iLexIR Ltd," iLexIR Ltd, Cambridge, UK, www.ilexir.com, 4 pages.

Carroll, J., "Parsing and Real-World Applications," School of Informatics, University of Sussex, Falmer, Brighton BN1 9QJ, UK, www.informatics.sussex.ac.uk/research/groups/nlp/carroll, 2010, Feb. 28, 2008, 3 pages.

De Felice, R., et al., "A classifier-based approach to preposition and determiner error correction in L2 English", Oxford University Computing Laboratory Wolfson Building, Parks Road, Oxford, OX1 3QD, UK, proceedings of the 22d International Conference on Computational Linguistics (Coling 2008 , Manchester, Aug. 18, 2008, pp. 169-176.

Medlock, B., "Investigating classification for natural language processing tasks", www.cl.cam.ac.uk, Jun. 2008, pp. 1-138.

Sebastiani, F., "Machine Learning in Automated Text Categorization," ACM Computing Surveys, vol. 34, No. 1, Mar. 2002, pp. 1-47.

European Search Report in Application No. 11 18 3934, Jun. 18, 2012, pp. 1-3.

Briscoe et al., "The Second Release of the RASP System," Proceedings of the COLING/ACL 2006, Interactive Presentation Session, pp. 77-80, Association for Computational Linguistics, Jul. 2006, Sydney, Australia.

\* cited by examiner

AUTOMATED ASSESSMENT OF EXAMINATION SCRIPTS

TECHNICAL FIELD

Embodiments herein relate to the field of examination assessment, and, more specifically, to automated assessment of scripts used in examination.

BACKGROUND

The task of automated assessment of free-response text passages or essays is distinct from that of scoring short text or multiple choice answers to a series of very specific prompts. Today there are at least 12 programs and associated products, such as the Educational Testing Service's (ETS) e-Rater, PearsonKT's KAT Engine/Intelligent Essay Assessor (IEA), and Vantage Learning's Intellimetric, which are deployed to assess essays as part of self-tutoring systems or as a component of examination marking. Because of the broad potential application of automated assessment to essays, these systems focus as much on assessing the semantic relevance or "topicality" of essays to a given prompt as on assessing the quality of the essay itself.

Many English for Speakers of Other Languages (ESOL) examinations include free text essay-style answer components designed to evaluate candidates' ability to write, with a focus on specific communicative goals. For example, a prompt might specify writing a letter to a friend describing a recent activity or writing an email to a prospective employer justifying a job application. The design, delivery, and marking of such examinations is the focus of considerable research into task validity for the specific skills and levels of attainment expected for a given qualification. The marking schemes for such writing tasks typically emphasize use of varied and effective language appropriate for the genre, exhibiting a range and complexity consonant with the level of attainment desired by the examination. Thus, the marking criteria are not primarily prompt or topic specific, but linguistic. This makes automated assessment for ESOL text (hereafter "AAET") a distinct subcase of the general problem of marking essays, which in turn suggests a distinct technical approach, if optimal performance and effectiveness are to be achieved.

BRIEF DESCRIPTION OF THE DRAWINGS

Embodiments will be readily understood by the following detailed description in conjunction with the accompanying drawings and the appended claims. Embodiments are illustrated by way of example and not by way of limitation in the figures of the accompanying drawings.

DETAILED DESCRIPTION OF DISCLOSED EMBODIMENTS

Figure 1:
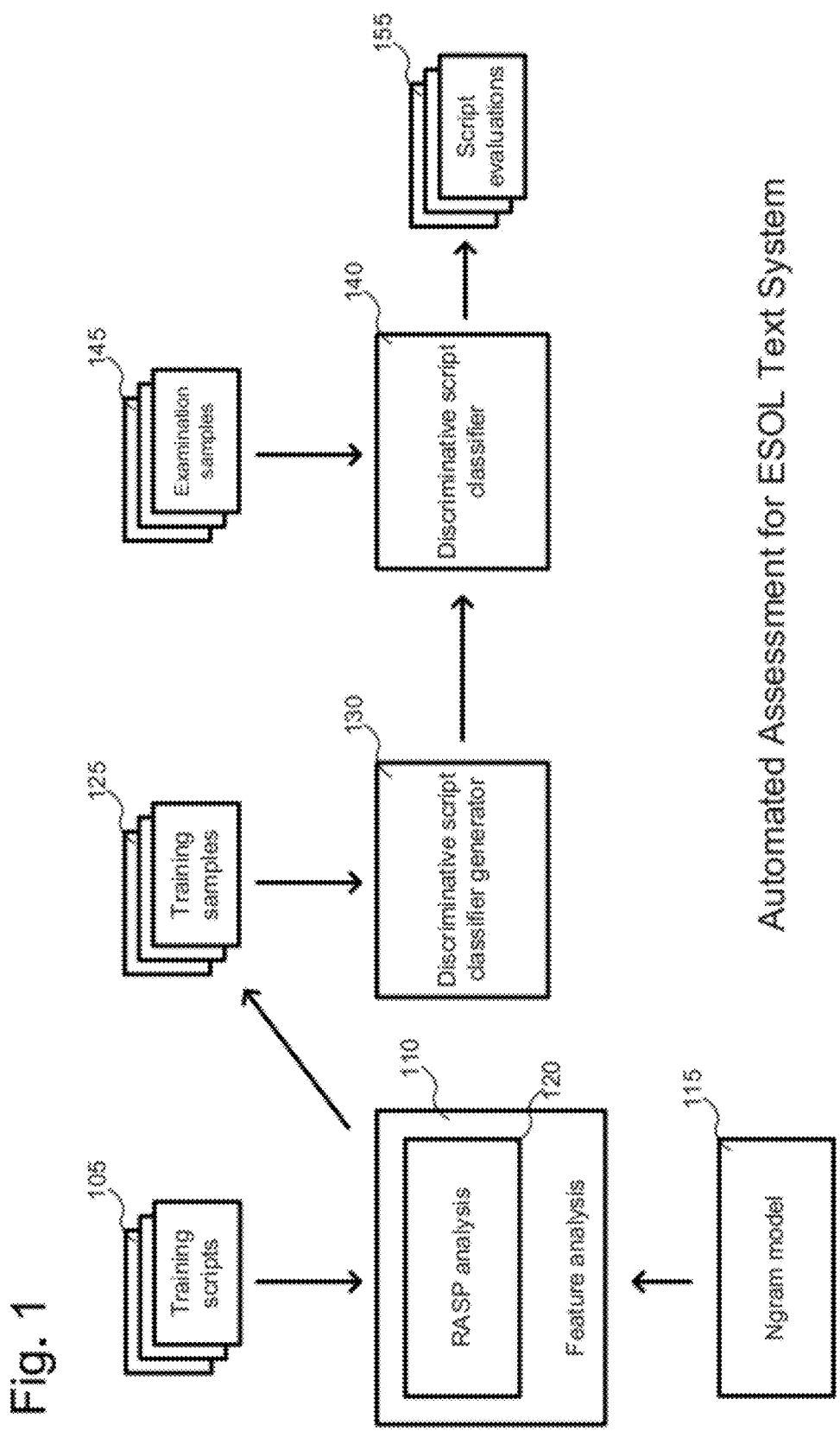
FIG. 1 illustrates a block diagram of components and information flows for a system for automated assessment of ESOL in accordance with various embodiments.

In the following detailed description, reference is made to the accompanying drawings which form a part hereof, and in which are shown by way of illustration embodiments that may be practiced. It is to be understood that other embodiments may be utilized and structural or logical changes may be made without departing from the scope. Therefore, the following detailed description is not to be taken in a limiting sense, and the scope of embodiments is defined by the appended claims and their equivalents.

Various operations may be described as multiple discrete operations in turn, in a manner that may be helpful in understanding embodiments; however, the order of description should not be construed to imply that these operations are order dependent.

For the purposes of the description, a phrase in the form "A/B" or in the form "A and/or B" means (A), (B), or (A and B). For the purposes of the description, a phrase in the form "at least one of A, B, and C" means (A), (B), (C), (A and B), (A and C), (B and C), or (A, B and C). For the purposes of the description, a phrase in the form "(A)B" means (B) or (AB) that is, A is an optional element.

The description may use the terms "embodiment" or "embodiments," which may each refer to one or more of the same or different embodiments. Furthermore, the terms "comprising," "including," "having," and the like, as used with respect to embodiments, are synonymous, and are generally intended as "open" terms (e.g., the term "including" should be interpreted as "including but not limited to," the term "having" should be interpreted as "having at least," the term "includes" should be interpreted as "includes but is not limited to," etc.). Additionally, the terms "optimal" and "optimize" as used herein, do not necessarily refer to a single, best solution or result, but rather refer to improvements over alternative implementation, systems, or techniques.

With respect to the use of any plural and/or singular terms herein, those having skill in the art can translate from the plural to the singular and/or from the singular to the plural as is appropriate to the context and/or application. The various singular/plural permutations may be expressly set forth herein for sake of clarity.

Embodiments herein provide automated assessment of examination scripts, such as English for Speakers of Other Languages (ESOL) examination scripts, written in response to prompts eliciting free text answers. In an embodiment, the task may be defined as discriminative preference ranking. Further, a system employing such methodology may be trained and tested on a corpus of manually-graded scripts. Embodiments herein, unlike extant solutions, are relatively prompt-insensitive and resistant to subversion, even if the operating principles are known. It may also be recognized that embodiments described herein may be practiced on non-ESOL, or even non-English, data for training and for evaluation. ESOL may encompass English for Speakers of Other Languages examination, as well other examinations of English ability, such as English as an only language or for participants who know more than two languages.

One of the key weaknesses of text classification methods previously deployed for automated assessment is that they are based on non-discriminative generative machine learning models. Generative models often embody simplifying assumptions about the underlying properties of the texts to be classified—for example, that the probability of each feature (e.g. a term or 'unigram' or a combination of words such as a digram, trigram, or ngram) in a text is independent of the others. Such models also weigh features of the text in ways only indirectly connected to the classification or ranking task—for example, using smoothed class conditional maximum likelihood estimates of features.

FIG. 1 is a block diagram illustrating a high-level view of various components, and information flows of embodiments of the techniques and systems described herein. While the example illustration shows particular components, orders of events and flow of information, in various embodiments, various processes may be performed in alternative orders or may be omitted entirely. As illustrated, FIG. 1 shows a feature analysis module 110, which operates on one or more input training scripts 105 to generate one or more training samples 125. In various embodiments, the training samples may comprise one or more feature types as well as instance counts for the feature types. In various embodiments, the feature analysis module may contain a RASP analysis module 120 which performs various analyses to determine lexical, part-of-speech, and parsing feature types and instance counts for the input training scripts. In alternative embodiments, the feature analysis module 110 may utilize feature type and instance count information from the RASP analysis module 120 without requiring that the RASP analysis module 120 be contained within the feature analysis module 110. In various embodiments, the feature analysis module 110 may also take one or more "background" ngram models as input and use these models to determine feature types such as error rate. Examples of these analyses, including the RASP analysis techniques, are discussed in greater detail below.

FIG. 1 also illustrates a discriminative script classifier generator 130. In various embodiments, the discriminative script classifier generator 130 receives the generated training samples 125 as input and outputs a discriminative script classifier 140 as output. In some, embodiments, the discriminative script classifier 140 may comprise a weight vector. Various details of the operation of the discriminative script classifier generator 130 to generate the discriminative script classifier 140 are discussed below.

FIG. 1 also illustrates that the discriminative script classifier 140 may operate on one or more examination samples 145 to produce one or more script evaluations 155. In various embodiments, the examination samples may be produced from examination scripts by the feature analysis module 110 or by another entity performing a similar process. In various embodiments the output script evaluations may take the form of pass/fail indications or scores along an evaluation range, as described below.

Embodiments herein apply discriminative machine learning methods, such as modern variants of the Large Margin Perceptron (LIMP) and the Support Vector Machine (SVM) to AAET. Discriminative classifiers make weaker assumptions concerning the properties of texts, directly optimize classification performance on training data, and yield optimal predictions if training and test material is drawn from the same distribution.

In the description of the classifiers, the following notations will be used:
N number of training samples
$v$ avg. number of unique features/training sample
$X \in \mathcal{P} R^D$ real D-dimensional sample space
$Y=\{+1,-1\}$ binary target label space
$x_i \in X$ vector representing the ith training sample
$y_i \in \{+1,-1\}$ binary category indicator for ith training sample
$f: X \to Y$ classification function Linear SVMs learn wide margin classifiers based on Structural Risk Minimization and continue to yield useful results in text classification experiments. In its dual form, linear SVM optimization equates to minimizing the following expression:

$$-\sum_i \alpha_i - \frac{1}{2}\sum_{i,j} \alpha_i \alpha_j y_i y_j x_i \cdot x_j \qquad (1)$$

subject to the constraint $\Sigma_i \alpha_i y_i = 0$ where the $\alpha$'s are the weight coefficients. The prediction is given by:

$$f(x) = \text{sign}\left(\sum_i \alpha_i y_i x_i \cdot x + b\right) \qquad (2)$$

where b is the bias and $\text{sign}(r) \in \{-1, +1\}$ depending on the sign of the input.

The practical use of the SVM model reties on efficient methods of finding approximate solutions to the quadratic programming (QP) problem posed by (1). A popular solution is implemented Joachims' SVM$^{light}$ package, in which the QP problem is decomposed into small constituent subproblems (the "working set") and solved sequentially. This yields a training complexity at each iteration of $O(q^2 \cdot v)$ where q is the size of the working set. Advantages provided by the procedure stem from the fact that $q \ll N$. The number of iterations is governed by the choice of q which makes it difficult to place a theoretical complexity bound on the overall optimization procedure, but experimental analysis suggests a super-linear bound of approximately $O(N^{1.5})$ with respect to the number of training samples, though this is quite heavily dependent on the separability of the data and the value of the regularization hyperparameter. The per sample time complexity for prediction in the SVM model is $O(M \cdot v)$ where M is the number of categories, as a separate classifier must be trained for each category.

In an embodiment, there is provided a novel variant of the batch perceptron technique, the Timed Aggregate Perceptron (TAP). The basic principle of the online perceptron learning model is to iteratively update a vector of weights in the sample space by adding some quantity in the direction of misclassified samples as they are identified.

The model in accordance with embodiments herein is based on a batch training method generating a weight vector, which is updated in the direction of all misclassified instances simultaneously. An aggregate vector is created at each iteration by summing all currently-misclassified samples (as determined by reference to the current weight vector) and normalizing according to a timing variable. The weight vector is then augmented in the direction of the aggregate vector and the procedure iterates. In various embodiments, the timing vector controls the magnitude of the aggregate vector as well as the stopping point of the training process. The timing variable is responsible for protection against overfitting; its value is initialized to 1, and gradually diminishes as training progresses until reaching zero, at which point the procedure terminates.

Given a set of N data samples paired with target labels ($x_i$, $y_i$) the TAP learning procedure returns an optimized weight vector $\hat{w} \in R^D$. In one embodiment, the prediction for a new sample $x \in R^D$ is given by:

$$f(x) = \text{sign}(\hat{w} \cdot x) \quad (3)$$

where the sign function converts an arbitrary real number to +/−1 based on its sign. The default decision boundary thus lies along the unbiased hyperplane $\hat{w} \cdot x = 0$, though a threshold can easily be introduced to adjust the bias.

In various embodiments, at each iteration, an aggregate vector $\tilde{a}_t$ is constructed by summing all misclassified samples and normalizing:

$$\tilde{a}_t = \text{norm}\left(\sum_{x_i \in Q_t} x_i y_i, \tau\right) \quad (4)$$

where norm(a,τ) normalizes a to magnitude τ and $Q_t$ is the set of misclassified samples at iteration t. In various embodiments, the misclassified samples may be determined as those samples that satisfy:

$$w_t x_i y_i < 1 \quad (5)$$

In various embodiments, a margin of +/−1 perpendicular to the decision boundary is utilized for effective classification of training samples.

In various embodiments, the timing variable τ is set to 1 at the start of the procedure and gradually diminishes. For example, in one embodiments, this diminishing is governed by the relation:

$$\tau_t = \tau_{t-1} - \begin{cases} 0 & L_{t-1} > L_t \\ t(L_t - L_{t-1})\beta & \text{otherwise} \end{cases} \quad (6)$$

$L_t$, the class-normalized empirical loss, may be generated to fall within the range (0, 1) and may be defined as:

$$L_t = \frac{1}{2}\left[\frac{|Q_t^+|}{N^+} + \frac{|Q_t^-|}{N^-}\right]. \quad (7)$$

In equation (7), $N^{+/-}$ denotes the number of class +1 or class −1 training samples respectively. In various embodiments, the β factor is used as a measure of balance of training distribution sizes, for example:

$$\beta = \frac{\min(N^+, N^-)}{N} \quad (8)$$

In the example of equation (8), an upper bound of 0.5 would represent balance. In various embodiments, termination may occur when either τ or the empirical loss $L_t$ reaches zero. In various embodiments, the rapidity of the timing schedule may govern how closely the TAP solution fits the training data; earlier stopping may lead to a more approximate fit.

In some cases, it may be beneficial to tune the rapidity of the timing schedule to achieve optimal performance on a specific problem, particularly when cross validation is feasible. In such cases a modified version of expression (6) may be used that includes a timing rapidity parameter, r:

$$\tau_t = \tau_{t-1} - \begin{cases} r-1 & L_{t-1} > L_t \\ rt(L_t - L_{t-1})\beta & \text{otherwise} \end{cases} \quad (9)$$

Note that this expression is equivalent to (6) in the case that r=1.

A pseudocode example of the TAP learning procedure is given in Table 1 (below).

TABLE 1

| TAP training procedure |
| --- |
| Input: training data {($x_1,y_1$),...,($x_N,y_N$)}<br>  τ = 1<br>  for t = 1, 2, 3... do<br>    if $\tau_t = 0 \vee L_t = 0$ then<br>      terminate and return $w_t$<br>    else<br>      $w_{t+1} = w_t + \tilde{a}_t$<br>    end if<br>    compute $\tau_{t+1}$<br>  end for |

The timing mechanism used in the example of Table 1 is motivated by the principle of early stopping in perceptron training, where the procedure is halted before reaching the point of minimum empirical loss. In this formulation, τ also governs the length of the aggregate vector, which is analogous to the learning rate in the standard perceptron. In the example, τ is decreased when the class-normalized empirical loss increases. An increase in empirical loss is an indication either that the model is beginning to overfit or that the learning rate is too high, and a consequent decrease in τ works to counter both possibilities. The scale of this decrease is governed in the examples above by three heuristic factors:

1. how far the process has progressed (t)
2. the magnitude of the increase in empirical loss ($L_t - L_{t-1}$), and
3. the balance of the training distributions (β)

The motivation behind the third, β, heuristic is that in the early stages of the process, unbalanced training distributions lead to aggregate vectors that are skewed toward a dominant class. If the procedure is stopped too early, the empirical loss will be disproportionately high for the subdominant class, leading to a skewed weight vector. The effect of β is to relax the timing schedule for imbalanced data which may result in higher quality solutions.

The TAP optimization procedure may utilize storage of the input vectors along with the feature weight and update vectors, resulting in a yielding space complexity of O(N) in the number of training samples. At each iteration, computation of the empirical loss and aggregate vector may be O(N·v), where v is the average number of unique features per sample. Given the current and previous loss values, computing τ is O(1) and thus each iteration may scale with time complexity O(N) in the number of training samples. The number of training iterations may be governed by the rapidity of the timing schedule. This schedule may have no direct dependence on the number of training samples, yielding an approximate overall complexity of O(N) (linear) in the number of training samples.

The TAP and SVM models described above perform binary discriminative classification, in which training exam scripts are divided into "pass" and "fail" categories. The confidence margin generated by the classifier on a given test script can be interpreted as an estimate of the degree to which that script has passed or failed, e.g. a "good" pass or a "bad" fail. However, this gradation of script quality is not necessarily modeled explicitly by the classifier, rather it relies on emergent correlation of key features with script quality.

In an embodiment, there is provided an alternative machine language (ML) technique called preference ranking. In such an embodiment, relationships between scripts are more explicitly modeled by utilizing an optimal ranking over a given sample domain. This ranking may be inferred through an optimization procedure that utilizes a specified ordering on training samples. By utilizing this ranking, the model may capture the understanding that some scripts are "better" than others, even across an arbitrary grade range, without necessarily having to specify a numerical score for each, or having to introduce an arbitrary pass/fail boundary.

In an embodiment, a modified version of the TAP techniques described above is provided that efficiently learns preference ranking models.

The TAP preference ranking optimization procedure utilizes a set of training samples, $x_1, x_2, \ldots, x_n$ and a ranking $<_r$ such that the relation $x_i <_r x_j$ holds if and only if a sample $x_j$ should be ranked higher than $x_i$ for a finite, discrete partial or complete ranking or ordering, $1 \leq i, j \leq n, i \neq j$. Given some ranking $x_i <_r x_j$, the method considers the difference between the feature vectors $x_i$ and $x_j$ as evidence. This difference may be known as a pairwise difference vector. The target of the optimization procedure is to compute a weight vector $\hat{w}$ that minimizes the number of misranked pairs of training samples with are separated by a predetermined margin. These misranked pairs may be formalized by the following constraints on pairwise difference vectors:

$$\forall (x_i <_r x_j) : \hat{w} \cdot (x_i - x_j) \geq \mu \quad (10)$$

where $\mu$ is the predetermined margin value.

The derived set of possible pairwise difference vectors grows quickly as a function of the number of training samples. An upper bound on the number of difference vectors for a set of training vectors is given by:

$$u = a^2 * r(r-1)/2 \quad (11)$$

where r is the number of ranks and a is the average rank frequency. This yields intractable numbers of difference vectors for even modest numbers of training vectors, e.g.: r=4, a=2000 yields 24,000,000 difference vectors.

To overcome this, in various embodiments the TAP preference ranking optimization procedure may employ a sampling strategy to reduce the number of difference vectors to a manageable quantity. An upper bound is specified on the number of training vectors, and then the probability of sampling an arbitrary difference vector is given by u'/u where u' is the specified upper bound and u is given above.

After sampling to determine input difference vectors, the optimization techniques then proceed similarly to that for the classification model (Table 1). The modified procedure is shown in the example of Table 2 (below). One difference between the examples of Tables 1 and 2 is that there is a one-sided margin in the example of Table 2.

TABLE 2

TAP ranked preference training procedure

Input: training data $\{(x_1 <_r x_2), \ldots, (x_N <_r x_{N+1})\}$
$\tau = 1$
for t = 1, 2, 3 . . . do
  if $\tau_t = 0 \lor L_t = 0$ then
    terminate and return $w_t$
  else
    $w_{t+1} = w_t + \tilde{\alpha}_t$
  end if
  compute $\tau_{t+1}$
end for For the example of Table 2, the misclassification condition may be realized as:

$$w_t \cdot (x_j - x_i) > 2 \quad (12)$$

and the aggregate vector $\tilde{a}_t$ constructed by:

$$\tilde{a}_t = norm\left(\sum_{x_i <_r x_j \in Q_t} x_j - x_i, \tau\right) \quad (13)$$

Note that, in the example above, the one-sided preference ranking margin takes the value 2, mirroring the two-sided unit-width margin in the classification model.

The termination of the optimization procedure may be governed by the timing rapidity hyper-parameter, as in the classification case. Training time may be approximately linear in the number of pairwise difference vectors, upper bounded by u' (see above).

The output from the training procedure is an optimized weight vector $w_t$, where t is the iteration at which the procedure terminated. Given a test sample, x, predictions may be made, analogously to the classification model, by computing the dot-product $w_t \cdot x$. The resulting real scalar may then be mapped onto a grade/score range via simple linear regression (or some other procedure), or used in rank comparison with other test samples.

As stated earlier, in application to AAET, an advantage of this approach is that the grade relationships between scripts are explicitly modeled. Preference ranking allows one to model ordering in any chosen way; for instance access may only be provided to pass/fail information, or a broad banding of grade levels, or access may be provided to detailed scores. Preference ranking can account for each of these scenarios, whereas classification models only the first, and numerical regression only the last.

Figure 2:
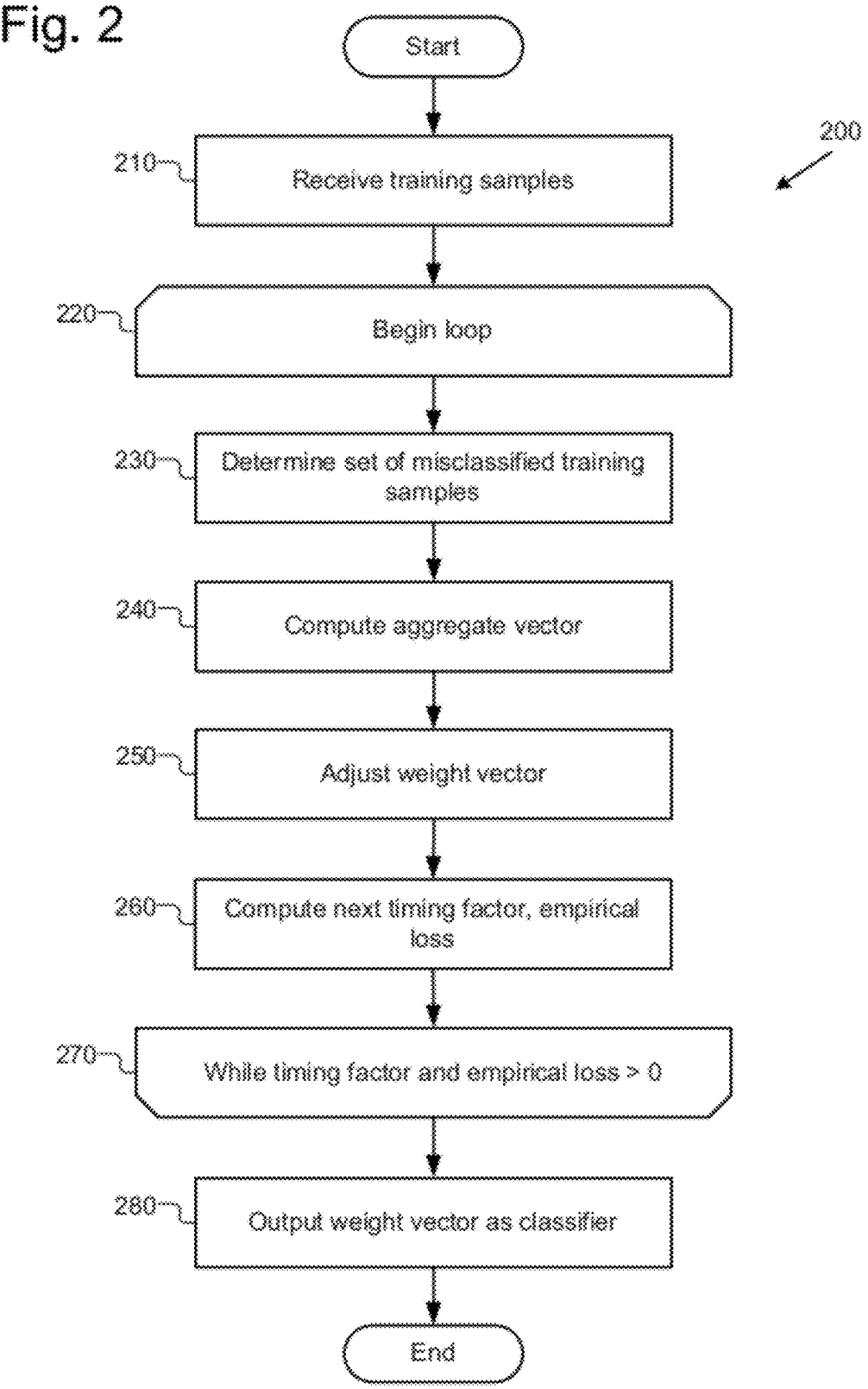
FIG. 2 is a flowchart illustrating a process for generating a discriminative text classifier in accordance with various embodiments.

FIG. 2 illustrates an example process 200 for using training samples to generate a classifier for use in evaluating scripts according to various embodiments. Various operations of process 200 may be performed, in various embodiments, by the discriminative script classifier generator 130. In various embodiments, the operations of process 200 may be performed in an order other than the order illustrated. In various embodiments, process 200 may utilize the techniques discussed above with respect to the TAP training procedure and the TAP ranked preference training procedure, as well as the examples of Tables 1 and 2.

The process may begin at operation 210, where the discriminative script classifier generator 130 receives training samples. At operation 220, the discriminative script classifier generator 130 enters a loop. At operation 230 a set of misclassified training samples is determined; examples of identifying misclassified samples are given above. At operation 240 an aggregate vector (e.g. $\tilde{a}_t$) is computed, as discussed above. At block 250 a weight vector (e.g., $w_t$) is adjusted using the aggregate vector. At operation 260, a next timing factor and empirical loss amount are computed. At operation 270, the loop is continued under the condition that a timing factor (e.g., $\tau$ discussed above and empirical loss factor (e.g., $L_t - L_{t-1}$) have not reached 0. At operation 280, after the loop has been terminated, the current adjusted weight vector is output as the classifier and the process ends.

AAET involves comparing and quantifying the linguistic variety and complexity, the degree of linguistic competence, displayed by a text against errors or infelicities in the performance of this competence. As such, it is unlikely that this comparison can be captured optimally solely in terms of feature types like, for example, ngrams over word forms. Variety and complexity will not only be manifested lexically but also by the use of different types of grammatical construction, while grammatical errors of commission may involve non-local dependencies between words that are not captured by any given length ngram. Nevertheless, the feature types used for AAET should be automatically extracted from text with good levels of reliability to be effectively exploitable.

In embodiments, the robust accurate statistical parsing (RASP) system may be used to automatically annotate both training and test data in order to provide a range of possible feature types and their instances so that their impact on the accuracy of the AAET system can be explored. In various embodiments, the RASP system is a pipeline of modules that may perform analyses such as: perform sentence boundary detection, tokenization, lemmatization, part-of-speech (PoS) tagging, and syntactic analysis (parsing) of text. In various embodiments, the PoS tagging and parsing modules are probabilistic and trained on native English text drawn from a variety of sources. For simplicity, in one embodiment RASP may be used unmodified with default processing settings and the most likely PoS sequence and syntactic analysis may be selected as the basis for feature extraction. The RASP system makes available a wide variety of output representations of text, Various embodiments herein make use of the set of feature types given along with illustrative examples in Table 3.

Eight AAET Feature Types

| Type | Example |
|---|---|
| lexical terms | and/mark |
| lexical bigrams | dear_mary/of_the |
| TFC: part-of-speech tags | NNL1/JJ |
| part-of-speech bigrams | VBR_DA1/DB2_NN1 |
| part-of-speech trigrams | JJ_NNSB1_NP1/VV0_PPY_RG |
| parse rule names | V1/modal_bse/+−/A1/a_inf |
| TFS: script length | numerical |
| corpus-derived error rate | numerical |

Lower-cased but not lemmatized lexical terms (i.e., unigrams) may be extracted along with their frequency counts, as in a "bag-of-words" model. These may be supplemented by bigrams of adjacent lexical terms. Unigrams, bigrams and trigrams of adjacent sequences of PoS tags drawn from the RASP tagset and most likely output sequence may be extracted along with their frequency counts. Instances of these feature types are included with their counts in the vectors representing the training data and also in the vectors extracted for unlabelled test instances.

In various embodiments, lexical term and ngram features are weighted by frequency counts from the training data and then scaled using tf·idf weighting and normalized to unit length. Rule name counts, script length and error rate may be linearly scaled so that their weights are of the same order of magnitude as the scaled term/ngram counts.

Figure 3:
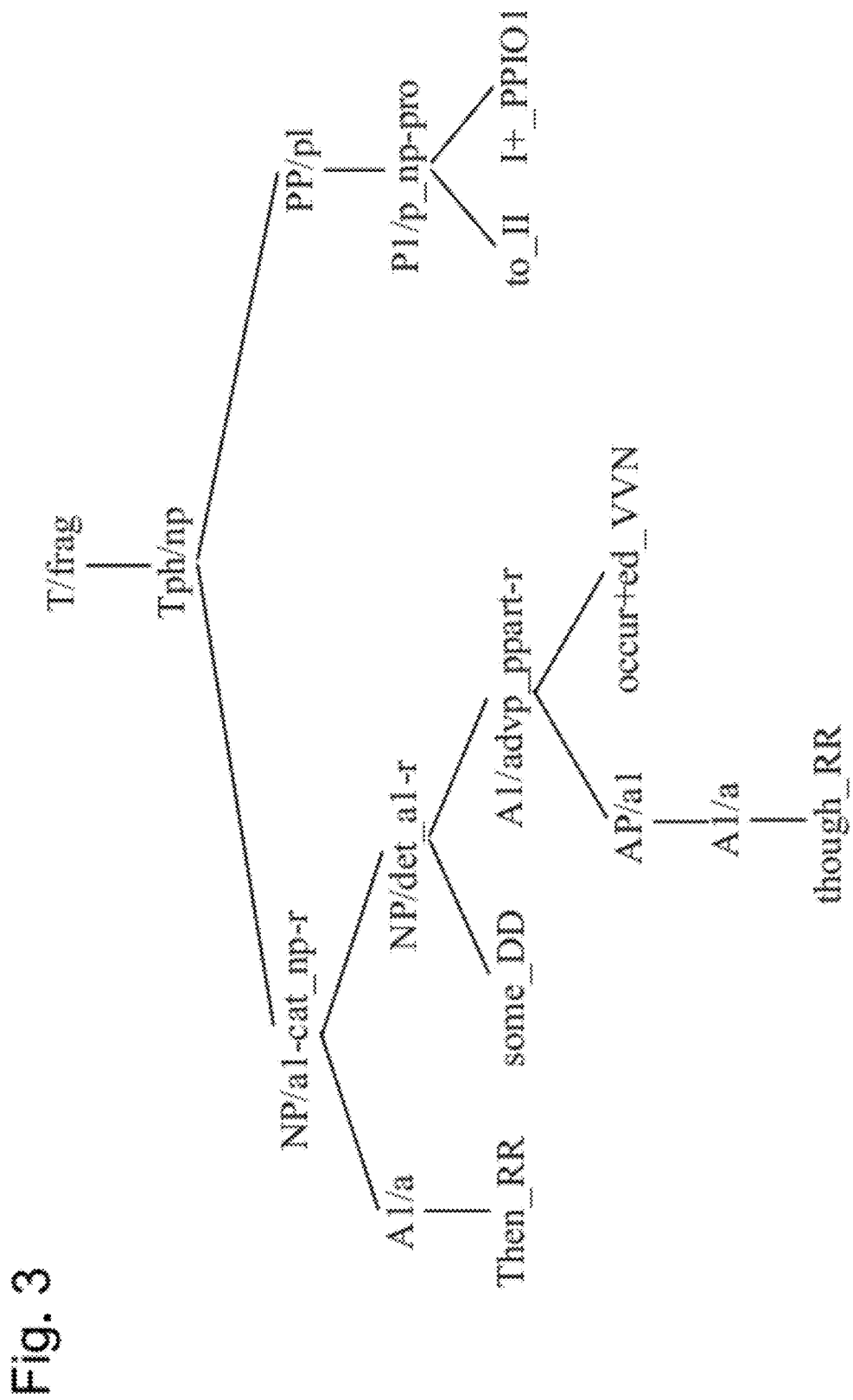
FIG. 3 illustrates a parse tree of a selected sentence analyzed by a RASP parser in accordance with various embodiments.
Figure 4:
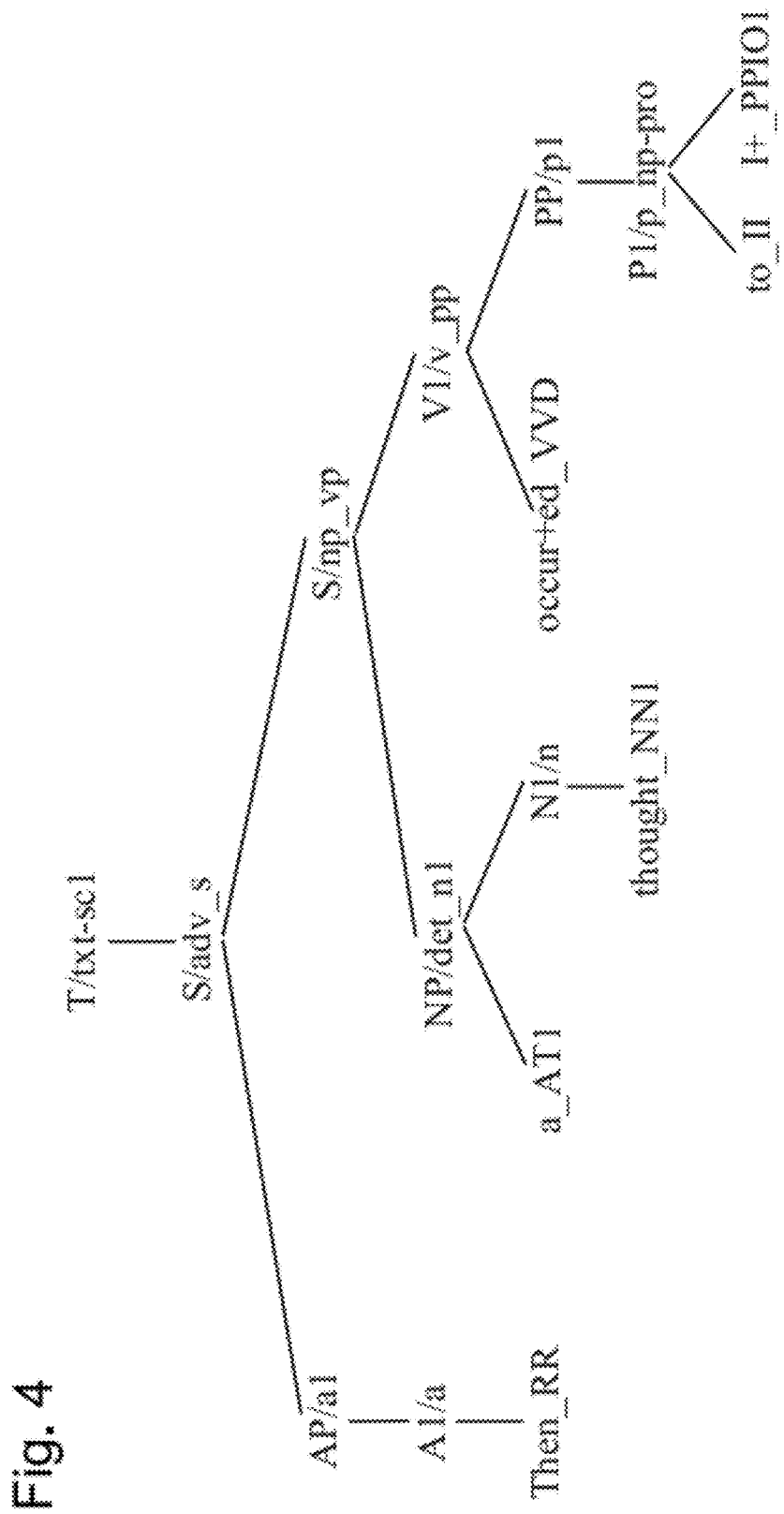
FIG. 4 illustrates a parse tree of a corrected version of the sentence of FIG. 3 analyzed by a RASP parser in accordance with various embodiments.

Parse rule names may be extracted from the phrase structure tree for the most likely analysis found by the RASP parser. For example, the following sentence from the training data, "Then some though occurred to me.", may lead to the analysis result given in FIG. 3, while the corrected version, "Then a thought occurred to me." may lead to the analysis given in FIG. 4. In this representation, the nodes of the parse trees are decorated with one of about 1000 rule names, which are semi-automatically generated by the parser and which encode detailed information about the grammatical constructions found. However, in common with ngram features, these rule names may be extracted as an unordered list from the analyses for all sentences in a given script along with their frequency counts. Each rule name together with its frequency count may be represented as a cell in the vector derived from a script. The script length in words may be used as a feature less as an informative feature in its own right than as a resource for balancing the effect of script length on other features. For example, in many scenarios, error rates, ngram frequencies, etc. will tend to rise with the amount of text. In various embodiments, the overall quality of a script may be assessed as a ratio of the opportunities afforded for the occurrence of some feature to its actual occurrence.

The automatic identification of grammatical and lexical errors in text is far from trivial. In existing systems, a few specific types of well-known and relatively frequent errors, such as subject-verb agreement, are captured explicitly via manually-constructed error-specific feature extractors. Otherwise, errors are captured implicitly and indirectly, if at all, via unigram or other feature types. The present system, in accordance with embodiments herein, improves on these approaches because the RASP parser rule names explicitly represent marked, peripheral or rare constructions such as by using an '-r' suffix, as well as combinations of extragrammatical subsequences, such as by suffixing a 'flag' marking. These markings may be seen by comparing FIG. 3 and FIG. 4. These cues may be automatically extracted without any need for error-specific rules or extractors and can capture many types of long-distance grammatical error.

However, in various embodiments, a single numerical feature representing an overall error rate of the script may also be included. This feature may be estimated by counting the number of unigrams, bigrams and trigrams of lexical terms in a script that do not occur in a very large "background" ngram model for English. On such model used in various embodiments has been constructed from approximately 500 billion words of English sampled from the world wide web. This task may be handled efficiently using a Bloom Filter. In alternative embodiments, frequency counts for smaller models and measures such as mutual information could be used. However, a more effective method is to use simple presence/absence over a very large dataset of ngrams which unlike, say, the Google ngram corpus retains low frequency ngrams.

Figure 5:
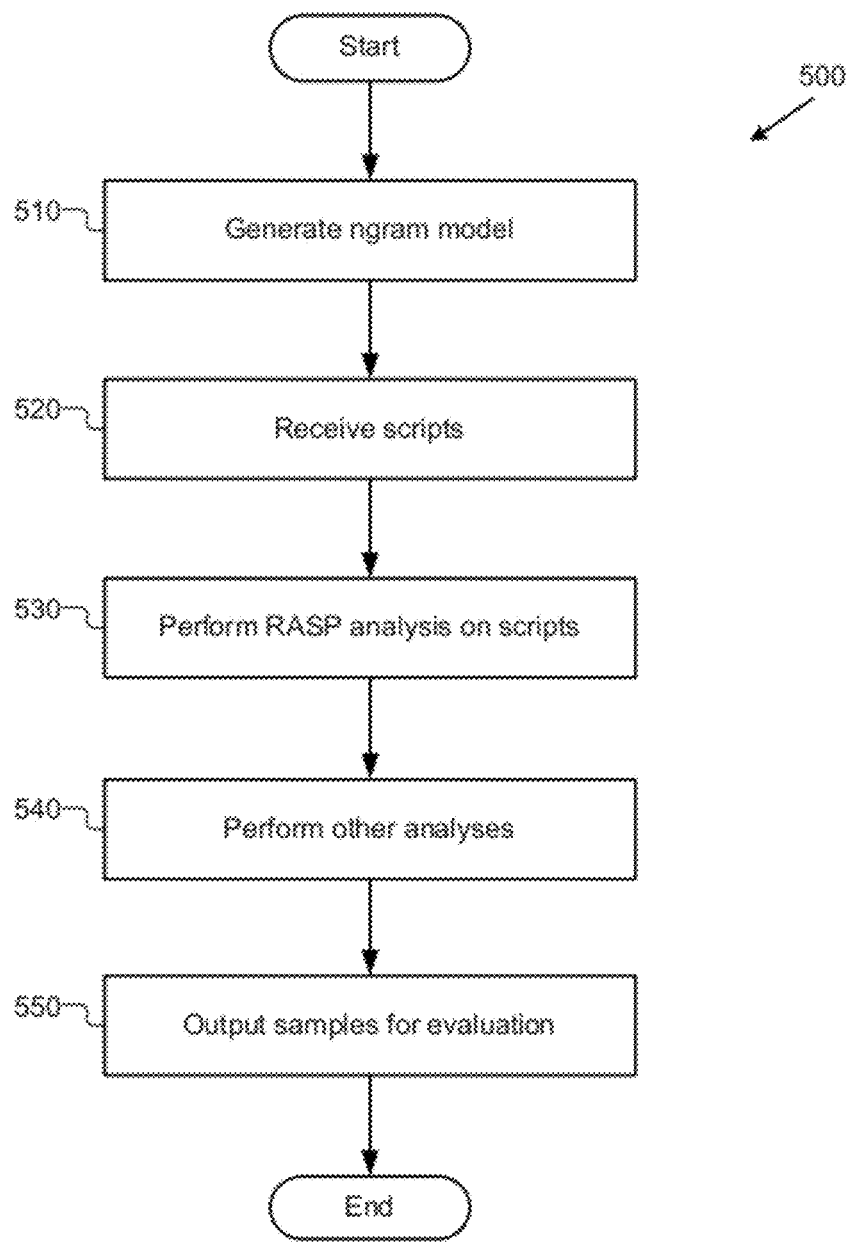
FIG. 5 is a flowchart illustrating a process for performing feature analysis on scripts in accordance with various embodiments.

FIG. 5 illustrates an example process 500 for performing feature analysis of a script in accordance with various embodiments. Various operations of process 500 may be performed, in various embodiments, by the feature analysis module 110. In various embodiments, the operations of process 500 may be performed in an order other than the order illustrated. The process may begin at operation 510, where an ngram model is generated for use in feature analysis. In one embodiment, the ngram model is generated relatively infrequently and in advance of script-specific analysis operations.

At operation 520, the feature analysis module 110 receives one or more scripts to analyze. In various embodiments, these scripts may comprise training scripts and/or examination scripts. At operation 530, the feature analysis module 110 performs RASP analysis on the scripts, such as, for example, those RASP analyses described above. At operation 540 other, non-RASP analysis, such as the error rate determination described above which uses the generated ngram model, may be performed by the feature analysis module 110. In various embodiments, the other analyses may include off-prompt detection, as will be described below. At operation 550, samples generated by the analysis of the scripts may be output and the process ends. As discussed herein, in various embodiments, the samples may comprise one or more indications of feature types along with instance counts for the feature types.

The feature types used in the experiments reported below have proved useful with respect to the competence level and text types investigated. In alternative embodiments, other features types, such as the connected, directed graph of grammatical relations over sentences, the degree of ambiguity within a sentence, the lemmas and/or morphological complexity of words, and others made available by the RASP system may be used. However, it is not clear that these will be optimally discriminative in all AAET scenarios. The system described herein includes automated feature extractors for most types of features made available through the various representations provided by RASP. This allows the rapid and largely automated discovery of an appropriate feature set for any given assessment task, using the experimental methodology exemplified below.

For various experiments, a set of transcribed handwritten scripts produced by candidates taking the First Certificate in English (FCE) examination written component was used. These scripts were extracted from the Cambridge Learner Corpus (CLC) developed by Cambridge University Press. These scripts were linked to metadata giving details of the candidate, date of the exam, and so forth, as well as the final scores given for the two written questions attempted by candidates. The marks assigned by the examiners were postprocessed to identify outliers, sometimes second marked, and the final scores were adjusted using RASCH analysis to improve consistency. In addition, the scripts in the CLC were manually error-coded using a taxonomy of around 80 error types providing corrections for each error. The errors in the example from the previous section were coded in the following way:
<RD>some|a</RD>  <SX>though|thought</SX>
<IV>occured|occured</IV>
where RD denotes a determiner replacement error, SX a spelling error, and IV a verb inflection error. In these experiments, approximately three thousand scripts were used from examinations set between 1997 and 2004, each about 500 words in length.

In order to obtain an upper bound on examiner agreement and also to provide a better benchmark to assess the performance of the AAET system compared to that of human examiners, four senior examiners were engaged to re-mark 100 FCE scripts drawn from the 2001 examinations in the CLC using the marking rubric from that year. From analysis of these marks and comparison to those in the CLC, the correlation between the human markers and the CLC scores is about 0.8 (Pearson) or 0.78 (Spearman's Rank), thus establishing an upper bound for performance of any classifier trained on this data.

In an experiment regarding binary classification, five classifier models were trained on 2973 FCE scripts drawn from the years 1999-2003. The aim was to apply well-known classification and evaluation techniques to explore the AAET task from a discriminative machine learning perspective and also to investigate the efficacy of individual feature types. The feature types described in Table 1 were used with all the models and the training data was divided into pass (mark above 23) and fail classes. Because there was a large skew in the training classes, with about 80% of the scripts falling into the pass class, the Break Even Precision (BEP) measure was used, defined as the point at which average precision recall, to evaluate the performance of the models on this binary classification task. This measure favors a classifier that locates the decision boundary between the two classes in such a way that false positives/negatives are evenly distributed between the two classes.

The models trained were naive Bayes, Baysian logistic regression, maximum entropy, SVM, and TAP. Consistent with much previous work on text classification tasks, the TAP and SVM models performed best and did not yield significantly different results. For brevity, and because TAP is foster to train, results for TAP only are reported in the following.

Figure 6:
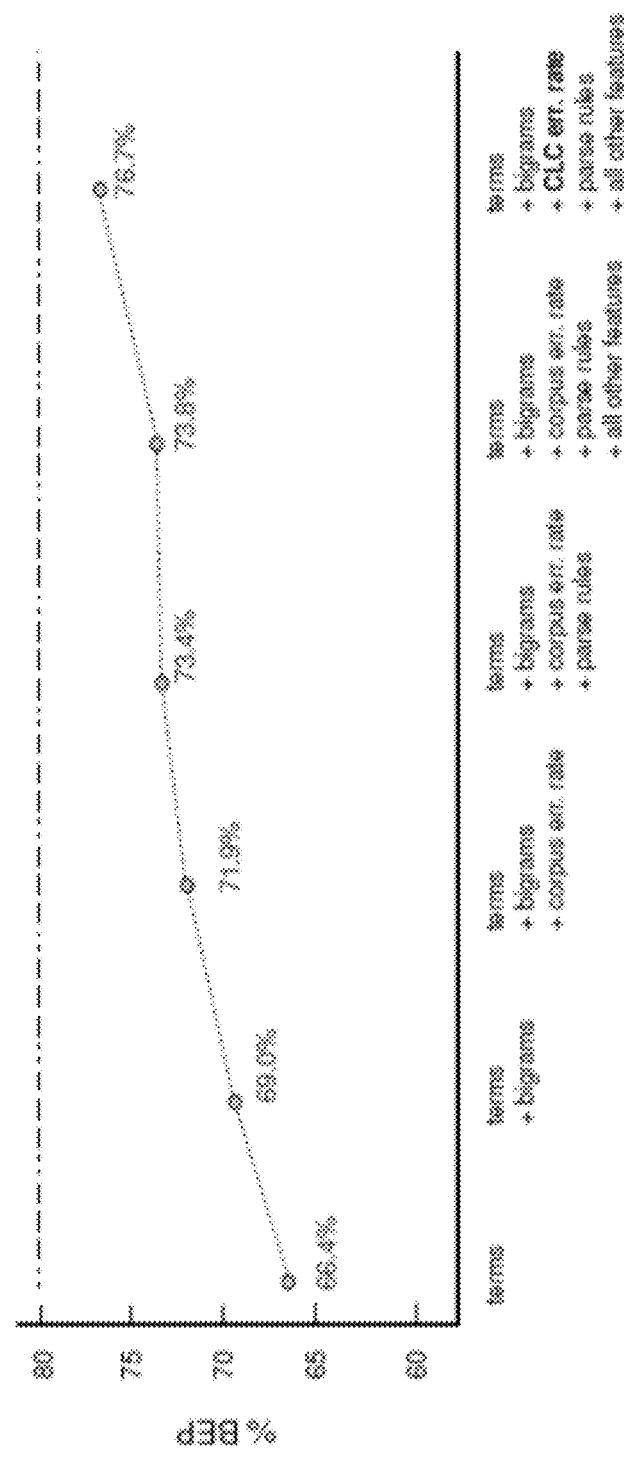
FIG. 6 illustrates the contribution of feature types to the overall accuracy of a classifier in accordance with various embodiments.

FIG. 6 shows the contribution of feature types to the overall accuracy of the classifier. With unigram terms atone it is possible to achieve a BEP of 66.4%. The addition of bigrams of terms improves performance by 2.6% (representing about 19% relative error reduction (RER) on the upper bound of 80%). The addition of an error estimate feature based on a public-domain ngram corpus (Web IT 5-gram corpus from the Linguistic Data Consortium) further improves performance by 2.9% (further RER about 21%). Addition of parse rule name features further improves performance by 1.5% (further RER about 11%), The remaining feature types in Table 1 contribute another 0.4% improvement (further about 3%).

These results provide some support for the choice of feature types described in Table 1. However, the final datapoint in the graph in FIG. 6 shows that if the error rate predicted from the CLC manual error coding is substituted for the corpus derived estimate, then performance improves a further 2.9%, only 3.3% below the upper bound defined by the degree of agreement between human markers. This strongly suggests that the error estimate is an important feature and that there is room for improvement in its method of estimation (see below).

As discussed above, a better way of modeling the AAET task may be to use the preference ranking paradigm. Here, experiments are carried out using the TAP implementation described above.

The TAP preference ranking model was trained with the feature types described in Table 3 as described above, and the correlation of the predicted values was compared with that of the four senior examiners and with the CLC scores for the test data. The results are given using Pearson's correlation coefficient in Table 4 and using Spearman's Rank correlation in Table 5.

TABLE 4

Correlation (Pearson's CC)

|  | CLC | Rater 1 | Rater 2 | Rater 3 | Rater 4 | Auto-mark |
|---|---|---|---|---|---|---|
| CLC |  | 0.82 | 0.77 | 0.73 | 0.78 | 0.78 |
| Rater 1 | 0.82 |  | 0.85 | 0.85 | 0.88 | 0.79 |
| Rater 2 | 0.77 | 0.85 |  | 0.78 | 0.79 | 0.77 |
| Rater 3 | 0.73 | 0.85 | 0.78 |  | 0.78 | 0.76 |
| Rater 4 | 0.78 | 0.88 | 0.79 | 0.78 |  | 0.71 |
| Auto-mark | 0.78 | 0.79 | 0.77 | 0.76 | 0.71 |  |
| Average: | 0.77 | 0.84 | 0.79 | 0.78 | 0.79 | 0.76 |

TABLE 5

Correlation (Spearman's Rank)

|  | CLC | Rater 1 | Rater 2 | Rater 3 | Rater 4 | Auto-mark |
|---|---|---|---|---|---|---|
| CLC |  | 0.80 | 0.79 | 0.75 | 0.76 | 0.80 |
| Rater 1 | 0.80 |  | 0.81 | 0.81 | 0.85 | 0.74 |
| Rater 2 | 0.79 | 0.81 |  | 0.75 | 0.79 | 0.75 |
| Rater 3 | 0.75 | 0.81 | 0.75 |  | 0.79 | 0.75 |
| Rater 4 | 0.76 | 0.85 | 0.79 | 0.79 |  | 0.73 |
| Auto-mark | 0.80 | 0.74 | 0.75 | 0.75 | 0.73 |  |
| Average: | 0.78 | 0.80 | 0.78 | 0.77 | 0.78 | 0.75 |

The performance of the preference ranking TAP model was also compared to a binary TAP classifier trained using the same feature types on the same data divided into pass/fail scripts. The correlation with the CLC scores on this test data was worse by 0.05 (Pearson) and 0.07 (Spearman) using classification as compared to preference ranking with the same underlying TAP model.

These results suggest that the AAET system described herein is able to achieve levels of correlation similar to those achieved by the human markers both with each other and with the RASCH-adjusted marks in the CLC. To give a more concrete idea of the actual marks assigned and their variation, marks assigned to a random sample of 10 scripts from the test data are provided in Table 6 (fitted to the appropriate score range by simple linear regression).

TABLE 6

Sample predictions (random ten)

| Auto-mark | Rater 1 | Rater 2 | Rater 3 | Rater 4 |
|---|---|---|---|---|
| 26 | 26 | 23 | 25 | 23 |
| 33 | 36 | 31 | 38 | 36 |
| 29 | 25 | 22 | 25 | 27 |
| 24 | 23 | 20 | 24 | 24 |
| 25 | 25 | 22 | 24 | 22 |
| 27 | 26 | 23 | 30 | 24 |
| 5 | 12 | 5 | 12 | 17 |
| 29 | 30 | 25 | 27 | 27 |
| 21 | 24 | 21 | 25 | 19 |
| 23 | 25 | 22 | 25 | 25 |

Figure 7:
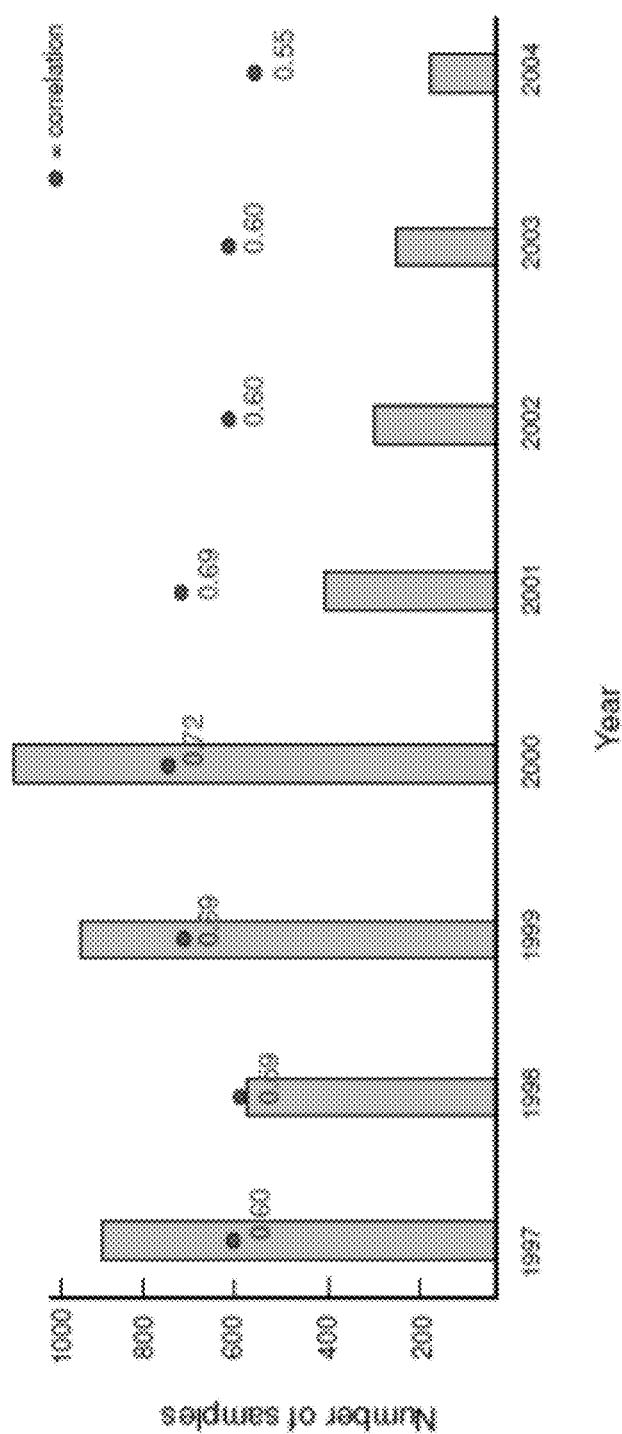
FIG. 7 illustrates the effect of training data variances over time and the effect of different amounts of training data on the correlation between predicted values and those of human markers in accordance with various embodiments.

The training data used so far in the described experiments is drawn from examinations both before and after the test data. In order to investigate both the effect of different amounts of training data and also the effect of training on scripts drawn from examinations at increasing temporal distance from the test data, the data was divided by year and the correlation (Pearson) with the CLC marks was trained and tested (see FIG. 7 for the results). There is an effect of training data size, as no result is as good as those reported using the full dataset for training. However, there is also a strong effect for temporal distance between training and test data, reflecting the fact that both the type of prompts used to elicit text and the marking rubrics evolve over time.

In order to explore the effect of different datasets on the error prediction estimate, a large corpus of English text was gathered from the web. Estimating error rate using a 2 billion word sample of text sampled from the UK domain retaining low frequency unigrams, bigrams, and trigrams, performance was improved over estimation using the Google ngram corpus by 0.09% (Pearson) in experiments which were otherwise identical to those reported above.

Although, the focus of these experiments has not been on content analysis, experiments have also been performed to compare the performance of an AAET system based primarily on such techniques (such as PearsonKT's and LEA) to the performance of the system in accordance with embodiments herein.

Incremental Semantic Analysis (ISA) was used to construct a system which, like TEA, uses similarity to an average vector constructed using ISA from high scoring FCE training scripts as the basis for assigning a mark. The cosine similarity scores were then fitted to the FCE scoring scheme. About one thousand scripts drawn from 1999 to 2004 were used for training and the scripts were tested on the standard test set from 2001. Using this approach, a correlation of only 0.45 (Pearson) was obtained with the CLC scores and an average of 0.43 (Pearson) with the human examiners. This contrasts with scores of 0.47 (Pearson) and 0.45 (Pearson) training the TAP ranked preference classifier on a similar number of scripts and using only unigram term features.

These results, taken with those reported above, suggest that there is not a clear advantage to using techniques that cluster terms according to their context of occurrence, and compute text similarity on the basis of these clusters, over the text classification approach deployed in embodiments described herein. Of course, this experiment does not demonstrate that clustering techniques cannot play a useful, role in AAET, however, it does suggest that a straightforward application of latent or distributional semantic methods to AAET does not yield optimal results with this number of training scripts.

Thus, in embodiments, a discriminative TAP preference ranking model for AAET and other examination scripts has been provided. This model can be coupled with the RASP text processing toolkit allowing fully automated extraction of a wide range of feature types many of which have been shown experimentally to be discriminative for AAET. Additionally, a generic and automated approach to error estimation is defined based on efficient matching of text sequences with a very large background ngram corpus derived from the web using a Bloom filter, and, experimentally, this has been shown to be a highly discriminative feature in the AAET model. This model also performs significantly better than an otherwise equivalent one based on classification as opposed to preference ranking. Text classification is at least as effective for AAET as a model based on ISA, a recent and improved latent or distributional semantic content-based text similarity method akin to that used in EA. Finally, the features assessed by the AAET model make subversion by students difficult as they more directly assess linguistic competence than previous approaches.

Various embodiments may also aid in detection of essay responses which are not responsive to the prompt given. In various embodiments, this detection may be performed during block 540 of FIG. 5. One issue which may be found in implementations of AAET for high-stakes examinations or other adversarial contexts is that a non-prompt specific approach to AAET is vulnerable to "gaming." For example, subjects preparing for an examination may memorize linguistically good (or competent) text and submit the memorized text regardless of the prompt they are given during examination. Given a content-agnostic AAET, such text may be graded highly when it does not demonstrate actual knowledge or mastery of English usage. Thus, in various embodiments, detection of off-prompt or non-responsive text may be aided by a content-based analysis.

Content analysis may be performed, in various embodiments, by using systems such as IEA and e-Rater. In various embodiments, LEA may use latent semantic analysis (LSA) for content analysis, while e-Rater may use random indexing (RI). Both LSA and RI techniques may utilize forms of word-by-essay clustering which allow the systems to generalize from specific- to distributionally-related words as measured by the words' occurrence in similar essays. In various embodiments, other techniques for constructing distributional semantic spaces may be utilized. Both probabilistic LSA ("PLSA") and Latent Dirichlet Allocation (LDA) have been used for some information retrieval applications.

In alternative embodiments, other content-based analyses may be employed. Some approaches to constructing distributional semantic spaces have been shown to outperform RI and singular value decomposition-based techniques like LSA when clustering words by semantic similarity. For example, in various embodiments, ISA, which may be a form of RI, may lead to better performance on semantic categorization of nouns and verbs. In embodiments of ISA, initially each word is assigned a signature. This signature may be assigned as a sparse vector of fixed dimensionality made up of a small number of randomly distributed +1 and −1 cells with all other cells assigned 0. d may be smaller than a dimensionality of possible contexts (or co-occurrences) of words given the text contexts used to define co-occurrence. In one embodiment, at each occurrence of a target word t with a context word c, the history vector of t is updated as follows:

$$h_t = i(m_c h_c + (1-m_c)s_c) \quad (14)$$

where i is a constant impact rate, $s_c$ is the signature vector of c, and $m_c$ is a factor which determines how much the history of one word influences the history of another word—the more frequent a context word, the less it will influence the history of the target word. In one embodiment, the m weight of c decreases as follows:

$$m_c = \frac{1}{\exp\left(\frac{Freq(c)}{K_m}\right)} \quad (15)$$

where $K_m$ is a parameter determining a rate of decay.

In various embodiments, ISA is fully incremental and does not rely on weighting schemes that require global computations over contexts. In various embodiments, these features made ISA more efficient to compute than other techniques. ISA may extend RI by updating the vector for t with the signature and history of c so that second order effects of the context word's distribution are factored into the representation of the target word.

As well as utilizing improved clustering techniques over LSA or RI such as ISA, in various embodiments, both weighting functions used for modeling co-occurrence and contexts used to assess co-occurrence may be varied. For instance, various models of semantic similarity may measure co-occurrence of words in local syntactic contexts, such as those provided by the grammatical relations output by a parser.

Given that embodiments of AAET discussed above are not prompt-specific in terms of training data, various embodiments, such as at block 540, may also include detecting of off-prompt or non-responsive scripts with a system that does not require retraining for different prompts. Various embodiments comprise a system which is able to compare question and answer scripts within a generic distributional semantic space. Because prompts are typically quite short, in various embodiments, it may not be expected that there will be much direct overlap between contentful terms or lemmas in a prompt and those in an answer text.

In various embodiments, an ISA model may be used for off-prompt essay detection. For example, in one embodiment, an ISA model was trained using 10,000 words of diverse English text using a 250-word stop list and ISA parameters of 2000 dimensions, impact factor 0.0003, and decay constant 50 with a context window of 3 words. In the embodiment, each question and answer may be represented by the sum of the history vectors corresponding to the terms they contain. Additionally, in the embodiment, additional dimensions may be included representing actual terms in the overall model of distributional semantic space. The addition of these terms may allow for capture of cases of literal overlap between terms in questions and in answers. In the embodiment, resulting vectors may then be compared by calculating their cosine similarity. In another embodiment, a standard vector space model may be used that measures semantic similarity using cosine distance between vectors of terms for question and answer via literal term overlap.

In one example, embodiments were tested for how well they performed in off-prompt essay detection. In this example, 109 passing First Certificate of English exam scripts from the Cambridge Learner Corpus were used. The exam scripts were produced in response to four different prompts:

1. During your holiday you made some new friends. Write a letter to them saying how you enjoyed the time spent with them and inviting them to visit you.
2. You have been asked to make a speech welcoming a well-known writer who has come to talk to your class about his/her work. Write what you say.
3. "Put that light out!" I shouted. Write a story which begins or ends with these words.
4. Many people think at the car is the greatest danger to human life today. What do you think?

In various embodiments, content-based analyses may be used to assign each answer text to the prompt which is most similar. In testing, the accuracy, defined by the ratio of correct assignments to all assignments, of the standard vector space model was 85%. By contrast, use of the augmented ISA model achieved 93% accuracy.

In various embodiments, a generic model for flagging putative off-prompt essays for manual checking may be constructed by manual selection of a set of prompts from past papers, as well as the current paper. The model may then be used to flag responses that match a past prompt better than the current prompt. White such models may include some false positives, the experimental results above show that an augmented ISA model may perform well enough to provide useful results. Accuracy may be improved in various embodiments through experimentation on larger sets of generic training text and on optimal tuning of ISA parameters.

Figure 8:
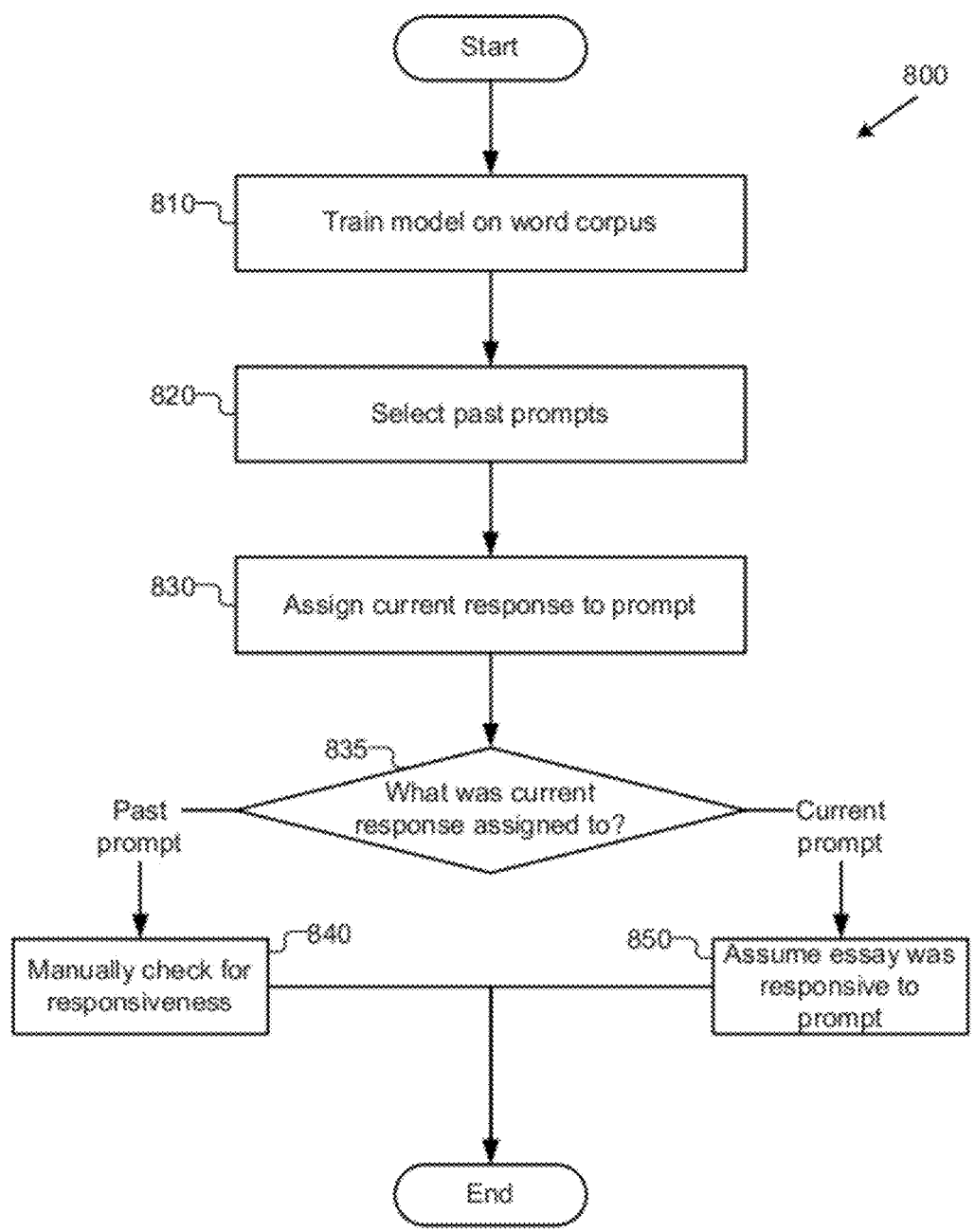
FIG. 8 is a flowchart illustrating a process for detecting scripts which are not responsive to prompts in accordance with various embodiments.

FIG. 8 illustrates an example process 800 for detecting off-prompt responses based on content-based analysis, Various operations of process 800 may be performed, in various embodiments, by a content analysis model (not illustrated), such as an ISA model configured as in the examples described above. In various embodiments, the operations of process 800 may be performed in an order other than the order illustrated. In various embodiments, process 800 may performed as part of operation 540 of process 500. The process may begin at operation 810, where a content analysis model, such as the ISA model described above, may be trained, such as on a corpus of words. At operation 820, one or more past prompts are selected to be used in comparison to currently-used prompts. In various embodiments, these prompts may be selected as prompts that are believed to lead to deceitful copying, have proven easier for students to memorize answers to, and/or prompts which are chosen at random.

At operation 830, a current response is assigned to one of the prompts. Next, at decision operation 835, the model determines which prompt the response is assigned to. If the response is assigned to a current prompt, then at operation 850 the response is assumed to be responsive to that prompt, and the results of the other analyses described above may be relied upon. If, however, the response is assigned to a past prompt, there is a likelihood that the response is simply copied from a known-good response. Thus, if the response is assigned to a past prompt, then at operation 840, the response is manually checked to see if it is responsive to one of the current prompts. The process may then end.

Figure 9:
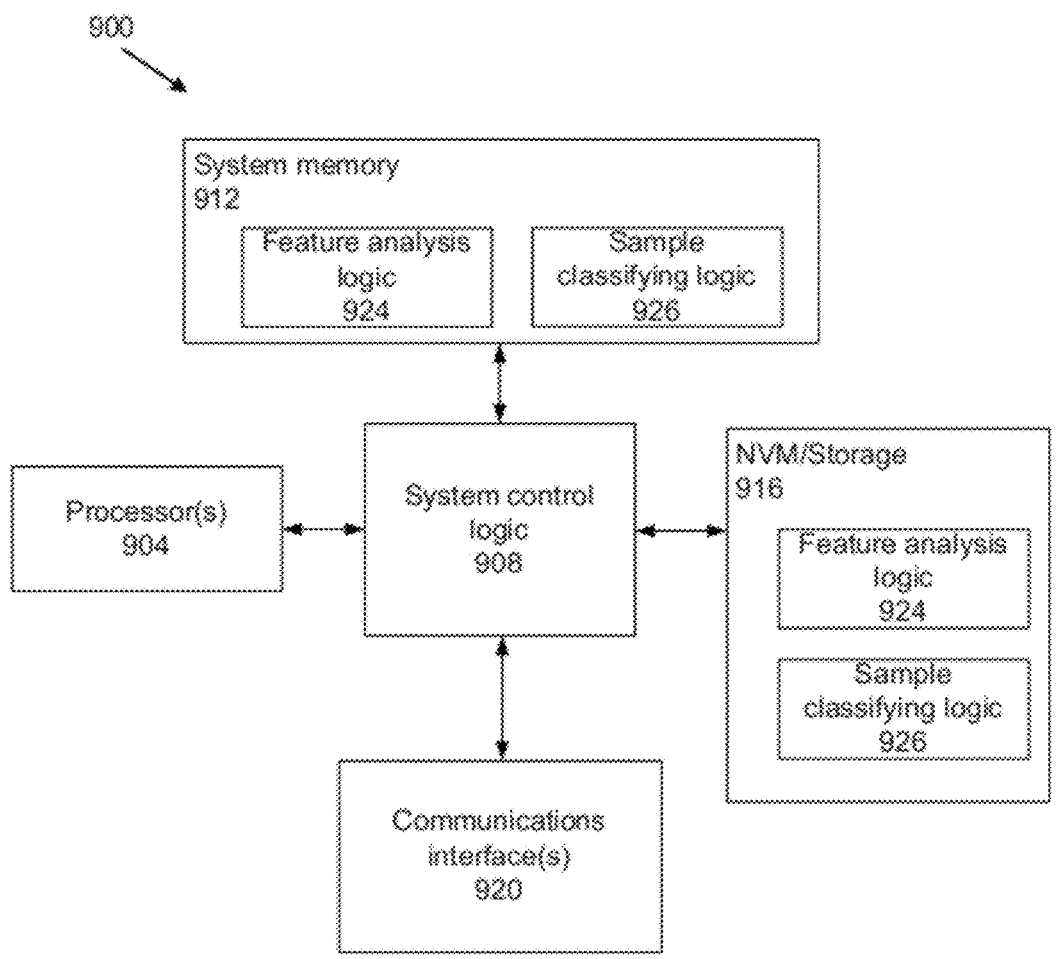
FIG. 9 illustrates an example computing environment configured to practice various aspects of various methods and systems described herein.

The techniques and apparatuses described herein may be implemented into a system using suitable hardware and/or software to configure as desired. FIG. 9 illustrates, for one embodiment, an example system 900 comprising one or more processor(s) 904, system control logic 908 coupled to at least one of the processor(s) 904, system memory 912 coupled to system control logic 908, non-volatile memory (NVM)/storage 916 coupled to system control logic 908, and one or more communications interface(s) 920 coupled to system control logic 908.

System control logic 908 for one embodiment may include any suitable interface controllers to provide for any suitable interface to at least one of the processor(s) 904 and/or to any suitable device or component in communication with system control logic 908.

System control logic 908 for one embodiment may include one or more memory controller(s) to provide an interface to system memory 912. System memory 912 may be used to load and store data and/or instructions, for example, for system 900. System memory 912 for one embodiment may include any suitable volatile memory, such as suitable dynamic random access memory (DRAM), for example.

System control logic 908 for one embodiment may include one or more input/output (I/O) controller(s) to provide an interface to NVM/storage 916 and communications interface(s) 920.

NVM/storage 916 may be used to store data and/or instructions, for example, NVM/storage 916 may include any suitable non-volatile memory or non-transitory computer-readable media, such as flash memory, for example, and/or may include any suitable non-volatile storage device(s), such as one or more hard disk drive(s) (HDD(s)), one or more solid-state drive(s), one or more compact disc (CD) drive's), and/or one or more digital versatile disc (DVD) drive(s) for example.

The NVM/storage 916 may include a storage resource physically part of a device on which the system 900 is installed or it may be accessible by, but not necessarily a part of, the device. For example, the NVM/storage 916 may be accessed over a network via the communications interface(s) 920.

System memory 912 and NVM/storage 916 may include, in particular, temporal and persistent copies of logic 924 and 926, respectively. Logic 924 may be configured to enable system 900, in response to operation of the logic, to practice some or all aspects of the feature analysis techniques described earlier. Logic 926 may be configured to enable system 900, in response to operation of the logic, to practice some or all aspects of the sample class' ring techniques described earlier. In various embodiments, logic 924 and 926 may be implemented via programming instructions of any one of a number of programming languages, including but not limited to C, C++, C#, HTML, XML, and so forth.

Communications interface(s) 920 may provide an interface for system 900 to communicate over one or more network(s) and/or with any other suitable device. Communications interface(s) 920 may include any suitable hardware and/or firmware. Communications interface(s) 920 for one embodiment may include, for example, a network adapter, a wireless network adapter, a telephone modem, and/or a wireless modem. For wireless communications, communications interface(s) 920 for one embodiment may use one or more antenna(s).

For one embodiment, at least one of the processor(s) 904 may be packaged together with logic for one or more controller(s) of system control logic 908. For one embodiment, at least one of the processor(s) 904 may be packaged together with logic for one or more controllers of system control logic 908 to form a System in Package (SiP). For one embodiment, at least one of the processor(s) 904 may be integrated on the same die with logic for one or more controller(s) of system control logic 908. For one embodiment, at least one of the processor(s) 904 may be integrated on the same die with logic for one or more controller(s) of system control logic 908 to form a System on Chip (SoC).

In various embodiments, system 900 may have more or fewer components, and/or different architectures.

Although certain embodiments have been illustrated and described herein, it will be appreciated by those of ordinary skill in the art that a wide variety of alternate and/or equivalent embodiments or implementations calculated to achieve the same purposes may be substituted for the embodiments shown and described without departing from the scope. Those with skill in the art will readily appreciate that embodiments may be implemented in a very wide variety of ways. This application is intended to cover any adaptations or variations of the embodiments discussed herein. Therefore, it is manifestly intended that embodiments be limited only by the claims and the equivalents thereof.

What is claimed is:

1. A computer-implemented method of automatically evaluating the linguistic quality of free-response text answers submitted by students in response to examination prompts, the method comprising:
   (A) configuring a computer device to embody an automated computerized text assessment system which is thereafter enabled to evaluate free-response text answers in response to examination prompts using discriminative preference ranking of predetermined linguistic text features, the configuring including generating a trained model weight vector for subsequent use in automatically evaluating said free-response text answers, by:

accessing a plurality of training linguistic vectors ($x_1, x_2, x_3, \ldots x_n$), each training linguistic vector comprising a plurality of numerical values representing predetermined linguistic features of text comprising sentences within a training text, at least some of said predetermined linguistic features representing at least one of lexical, part-of-speech or parsing of words within said sentences;

accessing, for each of a plurality of predetermined pairs of said training linguistic vectors ($x_i, x_j$), predetermined ranking data ($r_i, r_j$) that defines which one of the pair of training linguistic vectors ($x_i, x_j$) is representative of a better training text;

accessing an initial weight vector ($w_i$) comprising a plurality of numerical weights corresponding to the plurality of numerical values in the training vectors;

generating pairwise difference training vectors for a plurality of ranked pairs of training vectors ($x_j - x_i$) each pairwise difference training vector being calculated as a difference between a ranked pair of said training linguistic vectors; and performing an iterative process to adapt said initial weight vector ($w_i$) to a trained model weight vector ($w_m$) by:

i) calculating a dot product between a current weight vector and each pairwise difference training vector to generate a respective scalar value for each pairwise difference training vector;

ii) determining, for each pairwise difference training vector, if the current weight vector misclassified the pairwise difference training vector in dependence upon a comparison result obtained by comparing the scalar value for the pairwise difference training vector with a predetermined threshold;

iii) generating an aggregate vector ($\tilde{a}$) by summing the pairwise difference training vectors that said determining step determines are misclassified and normalizing the summed result with a current timing factor;

iv) calculating a new weight vector by arithmetically combining numerical values of the current weight vector with respectively corresponding numerical values of the generated aggregate vector; and v) repeating steps i) through iv) until the current timing factor reaches a predetermined condition, whereupon the then current weight vector becomes said trained model weight vector ($w_m$); and (B) subsequently using said trained model weight vector to automatically evaluate the linguistic quality of each of plural input free-text answers submitted for evaluation by:

generating a linguistic vector for an input free-text answer that is to be evaluated;

calculating, using a processor, a dot product between the trained model weight vector and the linguistic vector for the input free-text answer that is to be evaluated to generate a scalar value for the input free-text answer; and outputting an evaluation of the input free-text answer using the scalar value generated for the input free-text answer.

2. The method of claim 1, wherein the input text comprises an English script for a speaker of another language.

3. The method of claim 1, wherein determining if the current weight vector misclassified a difference training vector comprises determining if the scalar value for the difference training vector is above a predetermined threshold.

4. The method of claim 1, wherein each difference training vector comprises a first ranked training vector subtracted from a second ranked training vector.

5. The method of claim 1, further comprising analyzing one or more training texts to generate the training linguistic vectors.

6. The method of claim 5 wherein analyzing the one or more training texts comprises performing one or more lexical, part-of-speech, or parsing analyses on the training texts.

7. The method of claim 6, wherein the parsing analyses generates instance values for one or more informative parse rule names identifying specific grammatical constructions.

8. The method of claim 5, wherein analyzing the one or more training texts comprises generating a text length or error rate value for a training text.

9. The method of claim 8, wherein generating the error rate value for a training text comprises counting ngram lexical terms that cannot be found in a background ngram model.

10. The method of claim 1, wherein generating a linguistic vector for the input text comprises generating the linguistic vector based at least in part on a content-based model; and
outputting an evaluation of the input text comprises detecting whether the input text is responsive to a prompt based at least in part on the content-based model.

11. The method of claim 10, wherein detecting whether the input text is responsive to a prompt comprises:
selecting one or more past prompts;
assigning the input text, using the content-based model, to either one of the one or more past prompts or to one of one or more current prompts; and
if the input text is assigned to a past prompt, flagging the input text for manual checking as possibly not responsive to the one or more current prompts.

12. The method of claim 11, wherein the content-based model is an ISA model.

13. The computer-implemented method of claim 1, wherein said iterative process further comprises calculating a loss factor that depends on the number of difference training vectors said determining determines are misclassified during a current iteration of said iterative process.

14. The computer-implemented method of claim 13, wherein said iterative process further comprises calculating a new current timing factor in dependence upon said calculated loss factor.

15. The computer-implemented method of claim 14, comprising reducing the timing factor if the calculated loss factor is greater than the calculated loss factor from a previous iteration of the iterative process, and maintaining the timing factor at its current value if the calculated loss factor is less than the calculated loss factor from the previous iteration of the iterative process.

16. The method of claim 15, wherein reducing the timing factor comprises reducing the timing factor based at least in part on an increase in empirical loss generated by adjusting the weight vector.

17. The method of claim 16, wherein the empirical loss is based at least in part on a number of misclassified samples.

18. The method of claim 15, wherein reducing the timing factor comprises reducing the timing factor based at least in part on a measure of balance of training distribution for the set of training samples.

19. The computer-implemented method of claim 15, comprising repeating the iterative process until the loss factor or the time factor reaches a predetermined value and outputting the weight vector from the last iteration as the trained model weight vector.

20. An automated computerized script assessment system for evaluating the linguistic quality of free-response text answers submitted by students in response to examination prompts, the system comprising:
  a computing processor configured to embody an automated computerized text assessment system which is thereafter enabled to evaluate free-response text answers in response to examination prompts using discriminative preference ranking of predetermined linguistic text features, the configured processor generating a trained model weight vector for subsequent use in automatically evaluating said free-response text answers by:
  accessing a plurality of training linguistic vectors ($x_1, x_2, x_3, \ldots x_n$) each training linguistic vector comprising a plurality of numerical values representing predetermined linguistic features of text comprising sentences within training text scripts, at least some of said predetermined linguistic features representing at least one of lexical, part-of-speech or parsing of words within said sentences;
  accessing, for each of a plurality of predetermined pairs of said training linguistic vectors ($x_i, x_j$), predetermined ranking data ($r_i, r_j$) that defines which one of the pair of training linguistic vectors ($x_i, x_j$) is representative of a better training script;
  accessing an initial weight vector ($w_i$) comprising a plurality of numerical weights corresponding to the plurality of numerical values in the training linguistic vectors;
  generating pairwise difference training vectors for a plurality of ranked pairs of training vectors ($x_j-x_i$) each pairwise difference training vector being calculated as a difference between a ranked pair of said training linguistic vectors; and
  performing an iterative process to adapt said weight vector comprising:
    i) calculating a dot product between a current weight vector and each pairwise difference training vector to generate a respective scalar value for each pairwise difference training vector;
    ii) determining, for each pairwise difference training vector, if the current weight vector misclassified the pairwise difference training vector in dependence upon a comparison result obtained by comparing the scalar value for the pairwise difference training vector with a predetermined threshold;
    iii) generating an aggregate vector ($\tilde{a}$) by summing the pairwise difference training vectors that said determining step determines are misclassified and normalizing the summed result with a current timing factor;
    iv) calculating a new weight vector by arithmetically combining numerical values of the current weight vector with respectively corresponding numerical values of the generated aggregate vector; and
    v) repeating steps i) through iv) until the current timing factor reaches a predetermined condition, whereupon the then current weight vector becomes said trained model weight vector ($w_m$); and
  subsequently using said trained model weight vector to automatically evaluate the linguistic quality of each of plural input free-text answers submitted for evaluation by:
  generating a linguistic vector for an input free-text answer that is to be evaluated;
  calculating a dot product between the trained model weight vector and the linguistic vector for the input free-text answer that is to be evaluated, to generate a scalar value for the input free-text answer; and
  outputting an evaluation of the input free-text answer using the scalar value generated for the input free-text answer.

21. The system of claim 20, wherein said iterative process further comprises calculating a loss factor that depends on the number of difference training vectors said determining determines are misclassified during a current iteration.

22. The system of claim 21, wherein said iterative process further comprises calculating a new current timing factor in dependence upon said calculated loss factor.

23. The system of claim 22, wherein the discriminative script classifier generator is further configured to operate on the computing processor to reduce the timing factor if the calculated loss factor is greater than the calculated loss factor from a previous iteration of the iterative process, and to maintain the timing factor at a current value if the calculated loss factor is less than the calculated loss factor from the previous iteration of the iterative process.

24. The system of claim 23, the discriminative script classifier generator is further configured to repeat the iterative process until the loss factor or the time factor reaches a predetermined value and to output the weight vector from the last iteration as the trained model weight vector.

25. The system of claim 20, wherein the system further comprises a feature analysis module configured to operate on the computing processor to perform one or more feature analyses on training texts to obtain training linguistic vectors.

26. The system of claim 25, wherein the feature analysis module comprises a RASP module configured to operate the processor to perform one or more lexical, part-of-speech, or parsing analyses on the training texts.

27. The system of claim 25, further comprising an ngram model associated with the feature analysis module and used during operation by the feature analysis module to identify ngrams in training texts which are not well represented in the model.

28. The system of claim 27, wherein the ngram model is constructed using a bloom filter.

29. The system of claim 20, further comprising a content-based model configured to detect whether an input text is responsive to a prompt.

30. The method of claim 29, wherein the content-based model is configured to:
  assign an input text to either one of one or more past prompts or to one of one or more current prompts; and
  if the input text is assigned to a past prompt, flag the input text for manual checking as possibly not responsive to the one or more current prompts.

31. One or more non-transitory computer-readable media containing instructions which, as a result of execution by a computing device, configure the computing device so as to cause the computing device to automatically evaluate the linguistic quality of free-response text answers submitted by students in response to examination prompts using discriminative preference ranking of predetermined linguistic text features, said configured computing device generating a trained model weight vector for subsequent use in automatically evaluating said free-response text answers by:
  accessing a plurality of training linguistic vectors ($x_1, x_2, x_3, \ldots x_n$) each training linguistic vector comprising a plurality of numerical values representing predetermined linguistic features of text comprising sentences within a training text, at least some of said predetermined linguistic features representing at least one of lexical, part-of-speech or parsing of words within said sentences;
  accessing, for each of a plurality of predetermined pairs of said training linguistic vectors ($x_i, x_j$), predetermined ranking data ($r_i, r_j$) that defines which one of the pair of training linguistic vectors ($x_i, x_j$) is representative of a better training script;
  accessing an initial weight vector ($w_i$) comprising a plurality of numerical weights corresponding to the plurality of numerical values in the training vectors;
  generating a plurality of pairwise difference training vectors ($x_j - x_i$) each difference training vector being calculated as a difference between a pair of said training linguistic vectors ranked by said ranking data; and
  performing an iterative process to adapt said initial weight vector ($w_i$) to a trained model weight vector ($w_m$) by:
    i) calculating a dot product between a current weight vector and each pairwise difference training vector to generate a respective scalar value for each pairwise difference training vector;
    ii) determining, for each pairwise difference training vector, if the current weight vector misclassified the pairwise difference training vector in dependence upon a comparison result obtained by comparing the scalar value for the pairwise difference training vector with a predetermined threshold;
    iii) generating an aggregate vector ($\tilde{a}$) by summing the pairwise difference training vectors that said determining step determines are misclassified and normalizing the summed result with a current timing factor;
    iv) calculating a new weight vector by arithmetically combining numerical values of the current weight vector with respectively, corresponding numerical values of the generated aggregate vector; and
    v) repeating steps i) through iv) until the current timing factor reaches a predetermined condition, whereupon the then current weight vector becomes said trained model weight vector ($w_m$); and
  subsequently using said trained model weight vector to automatically evaluate the linguistic quality of each of plural input free-text answers submitted for evaluation by:
  generating a linguistic vector for an input free-text answer that is to be evaluated;
  calculating a dot product between the trained model weight vector and the linguistic vector for the input free-text answer that is to be evaluated to generate a scalar value for the input free-text answer; and
  outputting an evaluation of the input free-text answer using the scalar value generated for the input free-text answer.

32. The computer-readable media of claim 31, wherein said iterative process further comprises calculating a loss factor that depends on the number of difference training vectors said determining determines are misclassified during a current iteration of the iterative process.

33. The computer-readable media of claim 32, wherein said iterative process further comprises calculating a new current timing factor in dependence upon said calculated loss factor.

34. The computer-readable media of claim 33, comprising reducing the timing factor if the calculated loss factor is greater than the calculated loss factor from a previous iteration of the iterative process, and maintaining the timing factor at its current value if the calculated loss factor is less than the calculated loss factor from the previous iteration of the iterative process.

35. The computer-readable media of claim 34, comprising repeating the iterative process until the loss factor or the time factor reaches a predetermined value and outputting the weight vector from the last iteration as the trained model weight vector.

36. The computer-readable media of claim 31, wherein:
  the training vectors comprise instance values for one or more feature types for one or more training texts; and
  the instructions are further to cause the computing device to perform one or more lexical, part-of-speech, or parsing analyses to generate instance values for the one or more feature types for each of the one or more training texts.

37. The computer-readable media of claim 31, wherein the instructions are further to cause the computing device to count ngram lexical terms that cannot be found in a background ngram model to generate an error rate value for a text, the ngram model constructed using a bloom filter.

38. The computer-readable media of claim 31, wherein the instructions are further to cause the computing device to detect, through usage of an ISA model, whether an input text is responsive to a prompt.

39. The computer-readable media of claim 38, wherein detect whether an input text is responsive to a prompt comprises:
  assign an input text to either one of one or more past prompts or to one of one or more current prompts; and
  if the input text is assigned to a past prompt, flag the input text for manual checking as possibly not responsive to the one or more current prompts.

40. The computer-readable media of claim 31, wherein the instructions are further to cause the computing device to:
  generate one or more numerical linguistic vectors by measuring one or more feature types for one or more person-generated input texts;
  determine one or more script evaluations for the one or more numerical linguistic vectors through computation of a dot product of the weight vector and the numerical linguistic vectors; and
  output the determined one or more script evaluations.

* * * * *